US010384436B2

(12) United States Patent
Houben et al.

(10) Patent No.: US 10,384,436 B2
(45) Date of Patent: Aug. 20, 2019

(54) METHOD AND PRODUCTION LINE FOR MAKING TANGIBLE PRODUCTS BY LAYERWISE MANUFACTURING

(71) Applicant: Nederlandse Organisatie voor toegepast-natuurwetenschappelijk onderzoek TNO, The Hague (NL)

(72) Inventors: René Jos Houben, The Hague (NL); Andries Rijfers, The Hague (NL); Leonardus Antonius Maria Brouwers, The Hague (NL)

(73) Assignee: NEDERLANDSE ORGANISATIE VOOR TOEGEPAST-NATUURWETENSCHAPPELIJK ONDERZOEK TNO, 'S-Gravenhage (NL)

( * ) Notice: Subject to any disclaimer, the term of this patent is extended or adjusted under 35 U.S.C. 154(b) by 263 days.

(21) Appl. No.: 15/307,683

(22) PCT Filed: Apr. 30, 2015

(86) PCT No.: PCT/NL2015/050292
§ 371 (c)(1),
(2) Date: Oct. 28, 2016

(87) PCT Pub. No.: WO2015/167335
PCT Pub. Date: Nov. 5, 2015

(65) Prior Publication Data
US 2017/0050386 A1     Feb. 23, 2017

(30) Foreign Application Priority Data

Apr. 30, 2014 (EP) .................................. 14166552

(51) Int. Cl.
*B33Y 10/00* (2015.01)
*B33Y 30/00* (2015.01)
(Continued)

(52) U.S. Cl.
CPC ............ *B33Y 10/00* (2014.12); *B29C 64/153* (2017.08); *B29C 64/20* (2017.08); *B29C 64/357* (2017.08);
(Continued)

(58) Field of Classification Search
CPC ......... B33Y 10/00; B33Y 30/00; B33Y 40/00; B33Y 50/00
See application file for complete search history.

(56) References Cited

U.S. PATENT DOCUMENTS

2002/0145213 A1    10/2002  Liu et al.
2009/0020919 A1    1/2009   Marsac
(Continued)

FOREIGN PATENT DOCUMENTS

EP        1316408 A1     6/2003
EP        1946910 A2     7/2008
(Continued)

*Primary Examiner* — Austin Murata
(74) *Attorney, Agent, or Firm* — Hoffmann & Baron, LLP

(57) ABSTRACT

The invention relates to a method and a production line (10) for making tangible products by layerwise manufacturing. Layers of a uniform thickness are deposited on top of each other and solidified in a pattern that corresponds to a cross section of the product. The method and production line are in particular suited for making mutually different products out of powders of construction material. The construction material is deposited on the different building platforms (11,12) individually by a deposition head (13). A surplus of material is removed by a remover (14), preferably before the layer is solidified (15). This allows that the quantity of material can be adapted to the specific product on each building platform. The production line further comprises a platform conveyor (16) for conveying the towards and away from the deposition head repeatedly.

20 Claims, 9 Drawing Sheets

(51) Int. Cl.
*B33Y 40/00* (2015.01)
*B29C 64/20* (2017.01)
*B29C 64/153* (2017.01)
*B29C 64/357* (2017.01)
*B29K 105/00* (2006.01)

(52) U.S. Cl.
CPC .............. *B33Y 30/00* (2014.12); *B33Y 40/00* (2014.12); *B29K 2105/251* (2013.01)

(56) References Cited

U.S. PATENT DOCUMENTS

2009/0291308 A1   11/2009  Pfister et al.
2013/0108726 A1*  5/2013  Uckelmann ......... B29C 67/0007
                                                                                                425/174.4
2014/0065194 A1*  3/2014  Yoo ....................... B33Y 10/00
                                                                                                424/400

FOREIGN PATENT DOCUMENTS

| EP | 1946910 A3 | 7/2008 |
|---|---|---|
| EP | 2289652 A1 | 3/2011 |
| EP | 2727709 A1 | 10/2012 |
| WO | 2004014637 A1 | 2/2004 |
| WO | 092757 A1 | 6/2013 |

* cited by examiner

METHOD AND PRODUCTION LINE FOR MAKING TANGIBLE PRODUCTS BY LAYERWISE MANUFACTURING

This application is the U.S. National Phase of, and Applicants claim priority from, International Patent Application Number PCT/NL2015/050292 filed 30 Apr. 2015, which claims priority from EP 14166552.1 filed 30 Apr. 2014, each of which is incorporated herein by reference.

The invention relates to a method for making tangible products by layerwise manufacturing. More in particular, the present invention relates to such a method comprising the step of creating a layer of construction material with a uniform thickness alternately on a first building platform and a second building platform wherein such a layer is created by depositing construction material and removing a surplus of such material to obtain the uniform thickness and the step of solidifying at least a part of the layer of construction material.

The invention further relates to a production line for layerwise manufacturing of tangible products. More in particular the invention relates to such a production line comprising a first carrier comprising a first building platform for supporting a first tangible product and a second carrier comprising a second building platform for supporting a second tangible product. The production line further comprises a deposition head for depositing construction material onto the building platforms, a material remover for removing a surplus of the deposited construction material from the building platforms, and a solidification device for solidifying at least a part of the deposited construction material.

STATE OF THE ART

Layerwise manufacturing is a manufacturing method wherein tangible three-dimensional products are made by successive addition of layers on top of each other, which layers correspond to the cross sections at different levels of the tangible product. Layered products can be made by providing a uniform layer of liquid or powder, which liquid or powder is solidified in a predefined two dimensional pattern corresponding to the cross section of the product to be manufactured. The remaining, not solidified material is removed afterwards. The layers can also be directly deposited in the required two dimensional pattern, for example by printing. In such a method, the pattern is already determined during deposition of the material, not by the solidification. The material can be an ink or powder, which ink or powder is cured, sintered, or otherwise solidified to obtain a coherent product.

In a known method for layerwise manufacturing of a tangible three-dimensional product, a powder is used as a starting material, which powder is solidified by for example sintering. Such a method is disclosed in United States patent application US2009/0291308. According to this known method, a thin layer of powder is provided to an area that is delimited by a vertical wall and, at the bottom side, by a building platform. The layer is solidified by sintering into a coherent solid layer with a predefined shape, being a cross section of the product. Subsequently, the platform supporting the solidified layer moves downwards and a new powder layer is applied. The steps are repeated until the product is finished. Subsequently, the part of the powder that is not solidified and the finished product are removed before making another product.

The afore-mentioned system has one platform that is movable in the vertical direction. Such a system is in particular suitable for making products out of one type of material. It is possible to make several products having different shapes on such a platform, simultaneously. An example of such a method is disclosed in international patent application WO2004/014637. This known method is limited to products made out of one type of material. Also powder-based systems may be suitable for making products in which individual layers are made out of different materials. Such a system is for example disclosed in United States patent application US2002/0145213.

European patent application EP 2289652 discloses an apparatus that allows making different products quasi simultaneously. This known apparatus comprises different building platforms, which provides more flexibility than systems with only one building platform. The powder that is used for creating one layer of the products on different building platforms is deposited by a deposition head in one batch on a surface next to the building platforms. After being deposited, the material is shifted onto the building platforms that are all positioned in such a way that the surplus of powder from one building platform is shifted towards a neighbouring platform until at the end of the series of platforms the surplus is deposited into a bin. The platforms, more in particular the troughs comprising the platforms are positioned directly against each other in order to avoid that powder falls off when surplus of construction material of a first platform is shifted towards a neighbouring, second platform. A disadvantage of this method and apparatus is that the powder that is needed for creating a layer on the different platforms has to be deposited once. In particular when the number of platforms is high, or when the platforms are large, this requires that a huge amount of powder has to be shifted. Another disadvantage is that all the platforms receive the same powder.

SUMMARY OF THE INVENTION

It is an objective of the present invention to overcome the above mentioned and other problems of the prior art and to provide a method for rapid and flexible manufacturing of tangible products.

This objection of the invention is obtained by a method for making tangible products by layerwise manufacturing comprising the steps of creating a layer of construction material with a uniform thickness alternately on a first building platform and a second building platform wherein such a layer is created by depositing construction material and removing a surplus of such material to obtain the uniform thickness, and solidifying at least a part of the layer of construction material, characterised in that the construction material is deposited on the first building platform and the second building platform individually.

An advantage that the construction material is deposited on the first building platform and the second building platform individually is that the amount of construction material that is deposited on each building platform can be better adapted to the amount of material needed for creating a layer with a uniform thickness on each platform. An effect is that it is not necessary to deposit on the first building platform both the material that is needed for creating the layer on this platform and the material that is needed for creating a layer on the second platform. Further, the surplus of material deposited on the first platform will be less than in a production line where the total amount of material needed for both platforms is first deposited on the first platform and thereafter partly shifted onto the second platform. Consequently the production process will be faster. By individual deposition of material on the platforms, each of these platforms is provided with material directly from a deposition head, viz. a material providing device, so not via another platform. Where reference is made to depositing material onto a building platform, this includes depositing material on earlier deposited material or product such that the platform is supporting the deposited material.

In an embodiment of the method, the deposited layer of construction material is leveled by removing the surplus of the material. An advantage of combining the removal of the surplus of material and levelling the layer in one process step is that the layer of construction material with the proper uniform thickness is formed during the step of removing the surplus of material. An effect is that a layer of to be solidified material having the proper thickness is created in a fast way without additional steps and without additional equipment. Another effect is that the processes of removal and levelling can be better adapted to each other. These effects result in a faster and more flexible manufacturing of the products.

Several materials can be used for making tangible products by layerwise deposition. The deposited material may for example be a highly viscous material, for example a slurry. In an embodiment of the method, the construction material is a powder. An advantage of using a powder is that a powder can be deposited in a controlled way on a building platform. There are many methods and apparatus known by which a predefined amount of powder can be deposited and distributed on a platform. Another advantage of using a powder is that a powder may have a long shelf life which allows storing of the material for a long period of time, either in a warehouse or in the deposition equipment. It is further advantage of powders that the use of hazardous solvents may be avoided, which solvents otherwise should have to be exhausted.

In a further embodiment of the method, the removal of the surplus of material on a building platform starts while material is being deposited on the same building platform. An advantage of starting the removal even before all the construction material is deposited on a platform is that the amount of material on the building platform can be minimized. An effect is that only a minimum amount of material needs to be transported and that unwanted loss of material due to the movement of the building platform, including possible vibrations, and possible turbulence of surrounding air is minimized.

Another objective of the present invention is to provide a production line for additive manufacturing of tangible products, which production line overcomes earlier mentioned and other problems of the prior art and which production line allows rapid and flexible manufacturing of products, including mutually different products.

This objective of the invention is obtained by a production line for layerwise manufacturing of tangible products comprising
  a first carrier comprising a first building platform for supporting a first tangible product,
  a second carrier comprising a second building platform for supporting a second tangible product,
  a deposition head for depositing construction material onto the building platforms,
  a material remover for removing a surplus of the deposited construction material from the building platforms,
  a solidification device for solidifying at least a part of the deposited construction material, characterised by a platform conveyor for conveying the carriers towards and away from the deposition head repeatedly, which deposition head is suitable for depositing construction material on the first building platform and the second building platform individually.

An advantage of a production line comprising a deposition head which is suitable for depositing construction material on the first building platform and the second building platform individually is that the amount of material can be adapted to the amount needed for the uniform layer on the specific platform as was discussed before. An advantage of a conveyor for conveying the building platforms towards and away from the deposition head repeatedly is that subsequent layers can be deposited in an efficient way and that in principle only one deposition head is needed for making the products on the different platforms while still each product may be individually shaped. This results in an efficient and flexible production line. More in particular this allows making products having a different shape simultaneously.

In a preferred embodiment of the production line, each of the building platforms is enclosed in a trough for keeping construction material. An advantage of a through for keeping the construction material is that the material can be kept on the platforms without falling off, in particular during movement of the platforms. A further advantage is that the surface of the deposited material can be easily leveled to obtain a uniform thickness over the whole area of the building platform. These advantages of this embodiment allow fast moving of the building platforms and an efficient use of the whole area of the building platforms for manufacturing products.

Another embodiment of the production line comprises height adjustment means for moving the building platforms relative to the sidewalls of the trough in a direction parallel to the building direction. An advantage of moving a building platform relative to its sidewalls is that the height of the building platform can be adapted to the height of the product, viz. the height of the solidified part of the construction material. This allows that the distance between the surface of a most recent solidified layer and the rim of the sidewalls corresponds to the thickness of the next layer of material to be solidified. Such a geometry allows an easy removal of the surplus of deposited material and an easy levelling to obtain a layer with a uniform and predefined thickness.

In still another embodiment of the production line the material remover comprises a rotatable roller for removing material from the building platform. An advantage of a roller for the removal of material is that the amount of material that accumulates in front of the material remover during use will be reduced in comparison to the situation in which a rigid wiper is used because at least a part of the surplus of material will be removed away from the front of the roller to a more remote place. An effect is that the lateral forces on the deposited material, the already solidified material, and the building platform can be minimized. Consequently, the removal of the material leads to no or only a minimal mechanical disturbance of the process.

The platform conveyor of the production line may be an endless conveyor. An advantage of an endless conveyor is that the platforms can move or can be moved along the deposition head and possible other processing equipment repeatedly without reversing the direction of the movement of the platforms. An effect is that the platforms may approach the deposition head and other equipment from the same direction for each subsequent layer that is deposited and solidified. This is in particular advantageous in case that certain process parameters such as the rotating direction of a roller need to be adapted to the direction of the movement of the building platform relative to such equipment.

In a further embodiment of the production line, the building platforms are movable along the platform conveyor individually. An advantage of building platforms that can move along the conveyor individually is that the velocity of the platforms of the production line need not to be the same at each moment in time for all the platforms. An effect is that the velocity of for example the first building platform can be adapted to a specific process without the need that also the velocity of the second building platform needs to be adapted to the velocity of the first platform. Consequently, the whole manufacturing process is more flexible and can be faster than in a production line where all platforms move with the same velocity.

It will be appreciated that one or more elements of one embodiment may be combined with or replaced by an element of another embodiment.

DETAILED DESCRIPTION OF THE INVENTION

Figure 1:
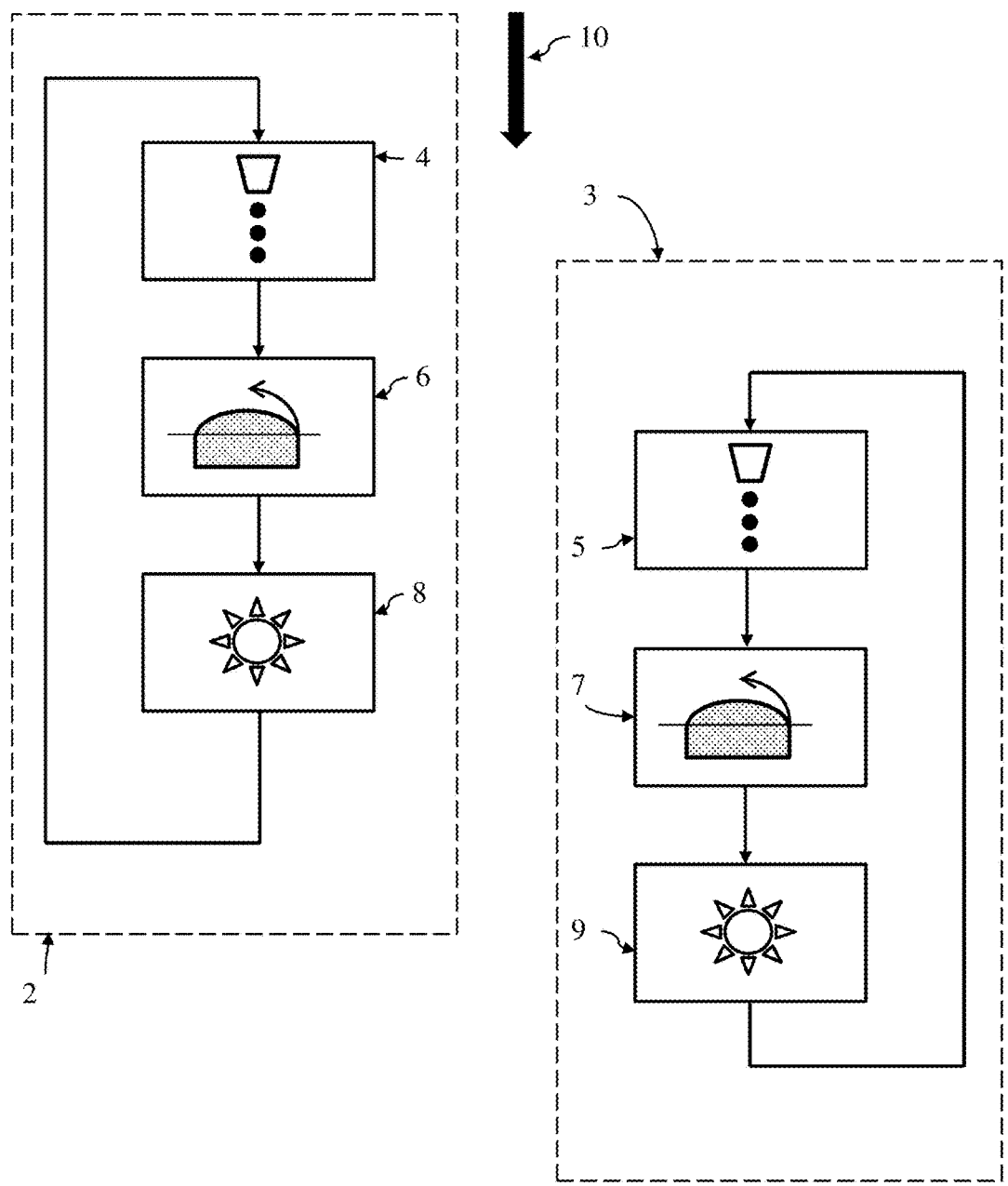
FIG. 1 is a schematic illustration of the method for making tangible products.

The method for making tangible products by layerwise manufacturing will be described with reference to FIG. 1. In a first step of the method a layer of a uniform thickness is created. This thickness of this uniform layer may be defined in different ways. For example the thickness of layer may be defined by depositing (4) and removing (5) well defined amount of construction material on a platform having a well know area. However, defining the thickness by such a method is difficult and is sensitive to disturbing effects. Usually, the thickness of the layer will be defined by a computer controlled or otherwise controlled movement of the building platform as will be described later. In a second step (7) at least a part of the layer will be solidified. The word solidification is used here in the meaning of making a coherent structure comprising the deposited construction material. So, such solidification may be transferring a liquid into a solid, but it may also be making a coherent structure out of small solid particles, viz. a powder. The energy that may be needed for the solidification, either by evaporation of a solvent, curing of a curable resin or melting of solid particles or the shell of solid particles, may be provide in several ways, depending on the material to be solidified. The energy source may provide electromagnetic radiation such as infrared and ultraviolet. Equipment for providing energy may comprise for example a lamp, a laser, or one or more light emitting diodes. The energy source may even be an oven or other conventional heating equipment, for example heating wires. However, it is preferred to use an energy source that allows selective solidification, either by using a mask or by scanning a beam of electromagnetic radiation. The solidification may also be obtained by depositing a binder on the powder layer. The binder may be a fluid that is partly absorbed by the powder and which binder is subsequently cured or dried in order to obtain a coherent structure of construction material and binder. To obtain a pattern that corresponds to a cross section of the product, either the binder is deposited in a pattern, for example by inkjet printing, or the binder is cured in pattern, for example by using an energy source as mentioned before. The binder and the construction material may also be deposited as a mixed powder. After deposition of this mixed powder on a building platform, the binder powder is first melted in a pattern by local heating, for example by a laser. Subsequently, the layer is cooled to form a coherent structure. The cooling may be cooling by a cooling apparatus or the layer may be cooled by transferring heat to the surrounding air.

In the first step of the method an amount of construction material is deposited on a building platform. A construction material is a material than can be solidified in order to realize a tangible product. The amount of material that is deposited will in general be more than the amount that is needed for creating a uniform layer having a predefined thickness, for example to avoid that somewhere there is a deficit in a layer of the product due to an uneven distribution of the deposited material or due to a defect in an earlier deposited layer. The surplus of material is preferably removed before solidification. Removing the surplus before solidification may be easier than removing solidified material. In addition, not removing the surplus before solidification may result in a varying and uneven quality of the different layers of a product, for example caused by a solidification that was not perfect.

After construction material has been deposited (4) on the first building platform for creating a layer for a first product, material is deposited (5) on the second building platform for making a second tangible product. For making a tangible product, usually multiple layers are required and the alternate deposition of just one layer on the first building platform and one layer on the second building platform will not satisfy. In practise multiple layers will be deposited alternately on the first and the second platform. The deposition of the material on the second platform may take place simultaneous in time with the removal (6) of a surplus of material from the first building platform, or simultaneous in time with the solidification (8) of material on the first platform. This means that in FIG. 1, where the time axis (10) is in downward direction, the two dashed squares representing the manufacturing of a first (2) and a second (3) product may be shifted with respect to each other along the time axis.

In a preferred embodiment of the method, the layer is leveled before solidification. In case that the construction material is deposited unevenly, for example because the material was deposited only at one position of a building platform, a certain degree of levelling may be obtained by vibrating the building platform. However, it is difficult to deposit the proper amount of material and, in addition, such a method would result in an accumulation of possible imperfections in the layers and consequently removing of surplus of material may be needed after solidification. Removing the surplus before solidification is advantageous for a proper solidification of the layer because the solidification device may be configured for solidifying a well defined amount of construction material. If the device is an energy source than this source may be configured to provide an amount of energy that is tuned to the thickness of the layer to be solidified for an efficient solidification and adhesion to an earlier deposited layer. If the solidification device is a device for providing a binder, than the amount of binder may be adapted to the thickness of the layer that has to be solidified. Although it is possible to remove (6,7) a well-defined amount of to be solidified material before levelling, it is preferred that the layer is leveled by removing the surplus of material. This means that the removal and the levelling take place in one and the same process as will be discussed in more detail below with reference to the production line.

The method can be applied for different type of materials, provided that a certain amount of material can be deposited on a platform and solidified as described before. The method and the production line are in particular suitable for making tangible products out of construction material that is provided in the form of a powder.

Certain steps in making the products can be performed simultaneously in order to realise a higher manufacturing speed. Construction material may for example be deposited (5) on the second platform or solidified (9) while at the same time a surplus of construction material is removed (6) from the first platform. Also solidification (8) of a layer on the first platform make take place at the same time that a surplus of material is removed (7) from the second platform or at the same time that material is deposited (5) on the second platform. In case that a production line comprising more than two building platforms is applied, even all the three processes of depositing, removal and solidification may take place at the same time on different platforms. Instead of performing just one processing step on a single platform, it is also possible to perform two or more steps on one platform simultaneously at least a part of the time. For example it is possible to deposit construction material on a part of the area of a building platform, whereas at another part of the same building platform a surplus of earlier deposited material is removed. Analogously, it is for example possible to solidify a part of the leveled layer whereas at the same time another part of the deposited layer is leveled.

In case that the equipment used for depositing the construction material and the equipment that is used for removing the surplus of material are positioned close to each other in comparison to the size of a building platform, more in particular in the moving direction of the platform, the removal of the surplus of material may start while material is being deposited at another position on the same building platform.

The method for making tangible products by layerwise manufacturing can be extended with additional steps. Such steps may include mechanical tooling, for example milling or polishing, and coating of the products. An additional step may also comprise layerwise manufacturing of a part of product by using another type of deposition head. The first deposition head may for example deposit construction material as a powder form whereas a second deposition head deposits layers by means of inkjet. Also a binder material may be deposited.

Figure 2:
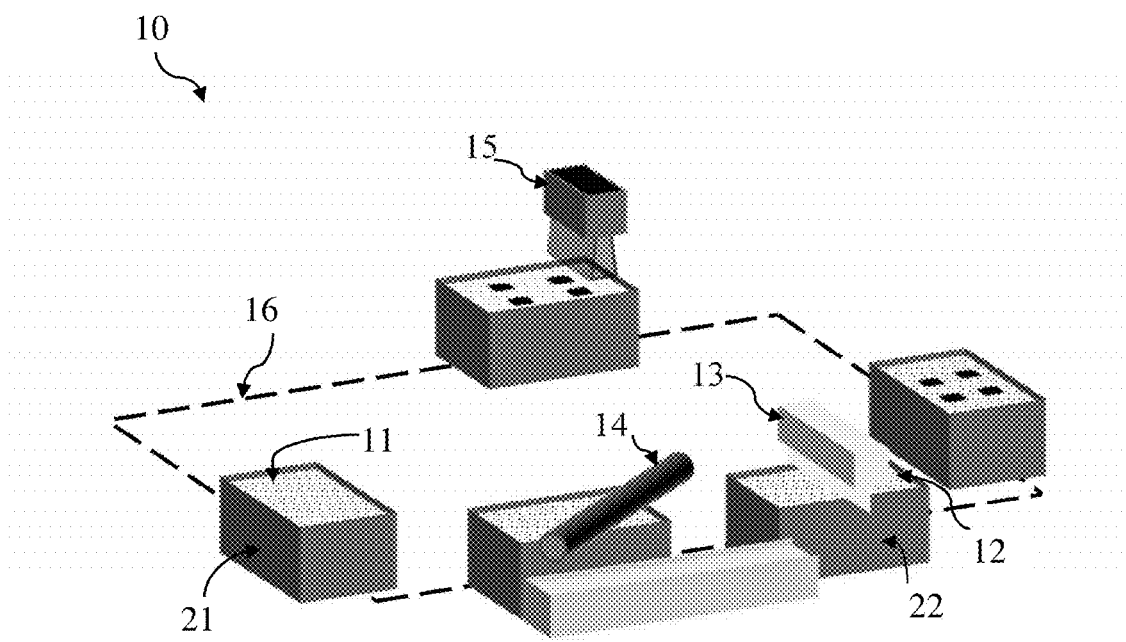
FIG. 2 schematically shows a production line for making tangible products.

The method can advantageously be brought into practise by a production line that will be discussed here in more detail with reference to the embodiment shown schematically in FIG. 2. The production line (10) comprises at least two carriers (21,22), each of the carriers comprising a platform (11,12) for supporting a tangible product. More in particular the platform is also suitable for supporting construction material, for example a powder. The carriers can transport the building platforms along a deposition head (13) repeatedly, which deposition head can deposit construction material onto each of the platforms. The type of deposition head will depend on the type of material that has to be deposited. The principle of operation, more in particular the way in which material is released from the deposition head onto the building platforms may be based on for example pressure, gravity, electric field, electrostatic force, or mechanical vibration.

The production line may comprise multiple deposition heads for depositing different materials, for example different construction materials. A deposition head may comprise different nozzles for depositing different materials or for depositing the same material more evenly over a surface, more in particular a building platform. A deposition head may deposit the material at a single spot, for example in the middle of a building platform. However, it is preferred to distribute the material along the platform evenly during the deposition. For this purpose the deposition head may comprise a slit corresponding to the width of the building platforms or multiple material outlets, for example nozzles or channels. The deposition head may also perform movements in a direction perpendicular to the building direction, for example in a direction perpendicular to the movement of the platforms. An even distribution of the material and also a more dense stacking of a powder may be supported by vibrations of the deposition head.

The trajectory of the carriers is determined by a conveyor (16) that allows the building platforms being moved towards and away from the deposition head repeatedly. The carriers may be at a fixed position relative to the conveyor in such a way that the velocity of the carriers is determined by the velocity of the conveyor. However, the carriers need not to be fixed to conveyor, as will be discussed later. In FIG. 2, five carriers are shown. In practise however, the production line preferably comprises more carriers in order to obtain a high production rate. However, the number of carrier may also be just two.

The production line further comprises a material remover (14) for removing a surplus of the construction material from a building platform. Surplus of material may be removed by for example a scraper, a wiper, a doctors blade, or by other mechanical means such as a roller. These mechanical means have in common that, in use, the building platform and the remover will move relative to each other in a direction that is perpendicular to the building direction. The building direction is the direction in which subsequent layers are stacked on top of each other. Preferably, the building platforms are conveyed by their carriers along the remover. This, however, does not exclude that the remover moves relative to, for example, the deposition head. The surplus of material may also be removed by suction or by a combination of mechanical means and suction.

In order to obtain a coherent product, the production line comprises a solidification device (15) for solidifying at least a part of the deposited construction material. The shape of the solidified part of a layer corresponds to a cross section of the product. Therefore, if the device is an energy source, the energy needs to be provided for most layers according to a predefined pattern. As discussed above for the method for making products, several types of energy sources may satisfy, including scanning lasers and lamps in combination with a mask for defining the pattern. When the solidification device is a device for providing a binder, the device may be adapted to deposit the binder in a pattern or the device may deposit binder material uniform distributed over the layer of construction material. In the later case, additional equipment is needed to cure the binder in a pattern that corresponds to a cross section of the product. A binder may be used to manufacture an intermediate product comprising the construction material, which product is sufficient coherent for careful handling but that need, for example, be sintered to obtain the desired mechanical properties. The production line may comprise an oven for such sintering.

To avoid that construction material falls of the building platform, the material has to be confined within borders. In principle it is possible to build walls with the construction material in order to keep construction material within borders and to assure that the surface area of layer that has to be solidified in a pattern is the same during the whole manufacturing process. This, however, requires that in addition to the product, also walls have to be manufactured. This does not only require additional construction material but may also require additional time. For these and other reasons it is preferred that the carriers comprise a trough for keeping construction material. In case that the construction material is for example a powder, such a trough can keep the powder within fixed borders, viz. the side walls of the trough and possibly a bottom, to avoid that powder falls off the platform.

Figure 3:
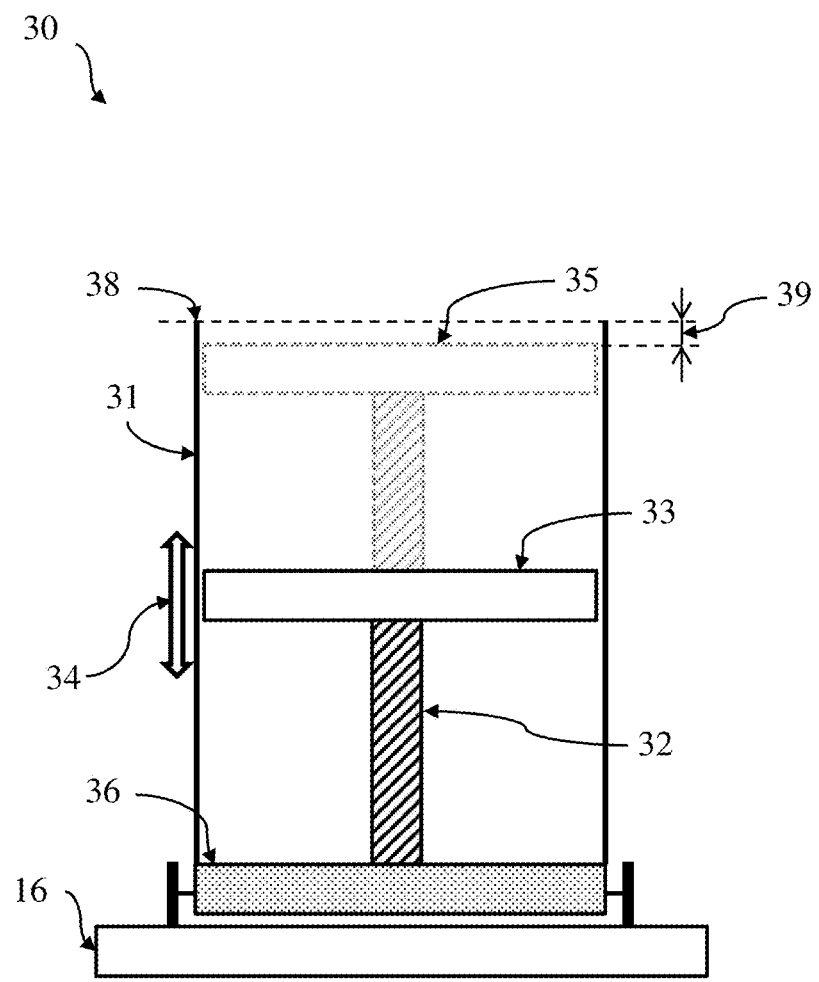
FIG. 3 schematically shows a cross sectional view of carrier comprising a building platform that is enclosed by a trough.

The trough may be at a fixed position relative to the building platform, viz. the building platform may be the bottom of the trough. After a certain amount of material is deposited onto the building platform, so into the trough, the surplus of material has to be removed and the layer may be leveled. In case that the side walls of the trough extend above the top of the layer of which a part has to be solidified, it will be difficult to remove this surplus material. For these and other reasons, it is preferred that the production line comprises height adjustment means for moving the building platforms relative to the side walls of the trough in a direction parallel to the building direction. These height adjustment means may be incorporated in the conveyor, for example in case that the carriers are at a fixed position on the conveyor. The height adjustment means may however also be incorporated in the carriers. In both cases the height of a platform may be adjusted for example by an electromotor and a worm wheel or a stepping motor, a piezoelectric actuator, or pneumatically. In FIG. 3 an embodiment of a carrier (30) is show which carrier comprises the height adjustment means (32), for example an electrical actuator or stepping motor for moving the building platform (33). The carrier further comprises a basis (36) that is either at a fixed position relative to the conveyor (16) or that allows the carrier to move along the conveyor. When starting the manufacturing process, the building platform may be at an upper position (35) just below the upper edge of the sidewalls, viz. the rim of the trough (31).

The thickness (39) of the first layer after levelling may be defined by the distance between the building platform (35) and the rim (38) of the trough by using a remover, for example a scraper, that is supported by the rim. By moving the scraper or a similar remover, all material that extends above the rim can be removed. During the manufacturing of the product, the platform is lowered (34) stepwise relative to the basis or the walls of the trough until the last layer is deposited. The thickness of each layer during this process is determined by the distance that the building platform is lowered for creating a layer. The lowering may be realised by using a stepping motor or actuator which may be computer controlled in order to obtain layers with a predefined thickness. Preferably, all layers have the same thickness, but the thickness need not to be the same. In case that different materials are deposited, the thickness may be adapted to the type of material. The height of the building platform need not be the same in all the carriers and the height may be adjusted individually in order to make different products or to make identical products but which products are at a certain moment in time in a different stage of manufacturing.

Figure 4:
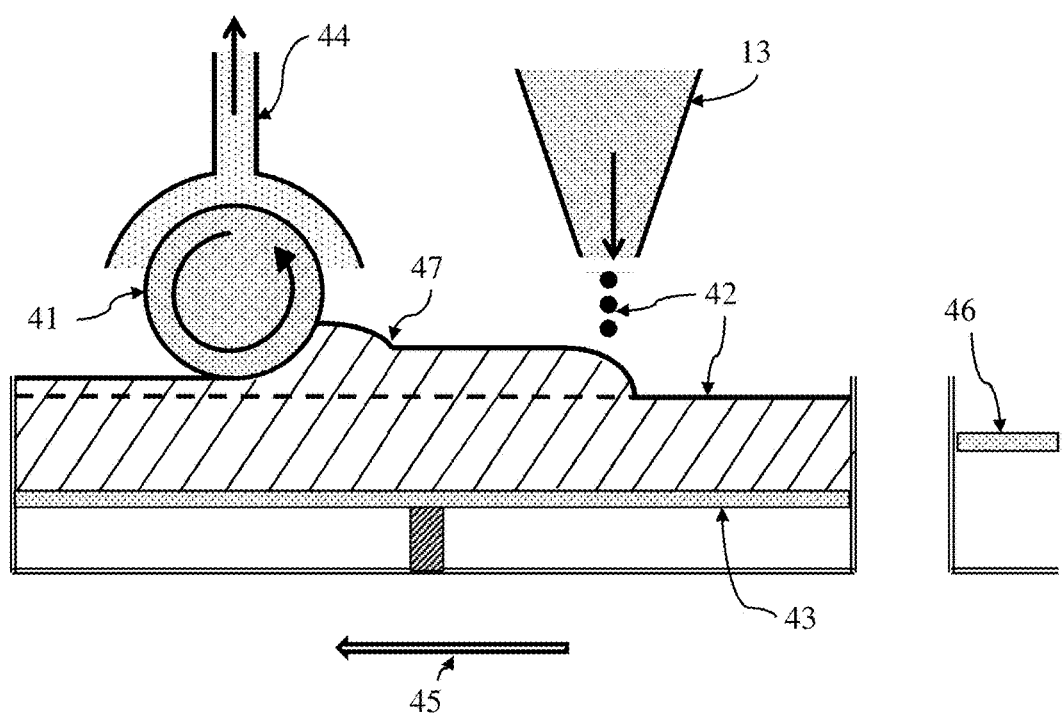
FIG. 4 schematically shows a cross sectional view of a material remover comprising a rotatable roller.

The production line comprises a material remover for removing a surplus of the deposited construction material from the building platforms. In FIG. 4 an embodiment of a material remover is shown comprising a roller (41) for removing a surplus of material. The construction material (42) is deposited by a deposition head (13) on the building platform (43). The surplus of material (47) that is picked up by the rotating roller is drawn away by suction by means of a exhaust hood (44). During use, the platform may move in the direction of the arrow (45) allowing material first to be deposited and subsequently being leveled by the roller. Also shown in FIG. 4 is a part of a neighbouring, second, building platform (46). The distance between two neighbouring platforms or troughs comprising the platforms may larger than the size of a platform in that direction or the neighbouring platforms or troughs comprising the platforms may make contact.

Figure 5:
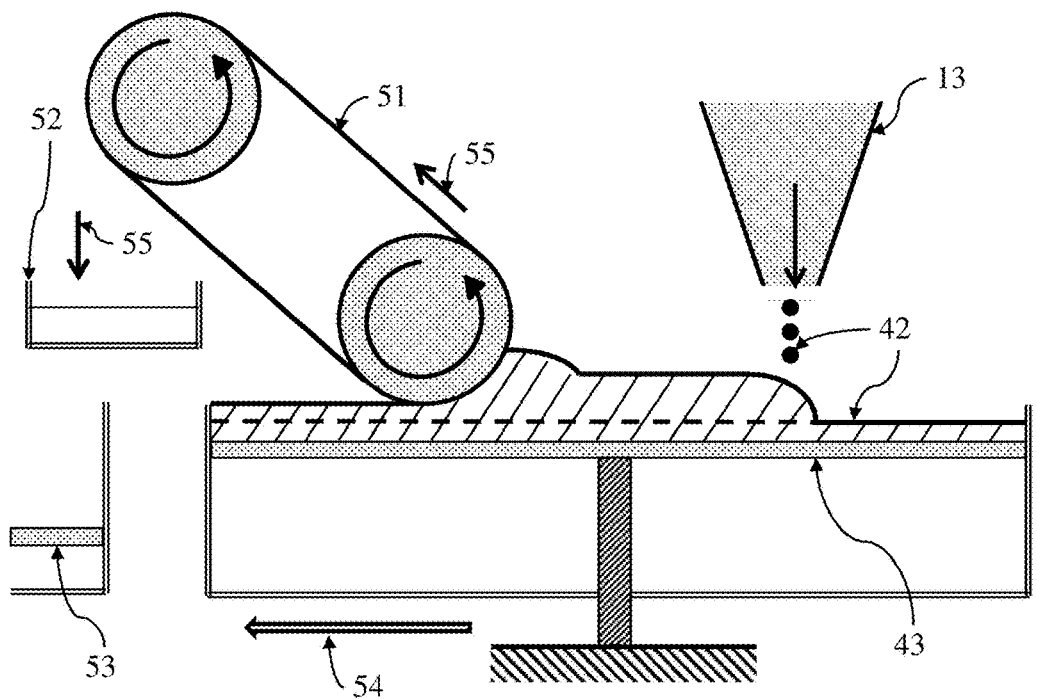
FIG. 5 schematically shows a cross sectional view of a material remover comprising a conveyor belt for conveying material from the building platform.

Another embodiment of the remover is shown in FIG. 5. This embodiment comprises a conveyor belt (51) for conveying a surplus of material (54) away from the building platform (43) towards a bin (52) in the direction of the arrows (55). As in the embodiment shown in FIG. 4, the construction material (42) is deposited by a deposition head (13). The direction of the movement of the building platform relative to the remover and the deposition head is indicated with an arrow (54). This direction is such that material is first deposited on the building platform and that the surplus of material is removed afterwards. The distance between the deposition head (13) and the remover may be so large that surplus of material is only removed after all the construction material that is needed for creating a layer, has been deposited on the platform. Also a part of a neighbouring platform (53) is shown.

Figure 6:
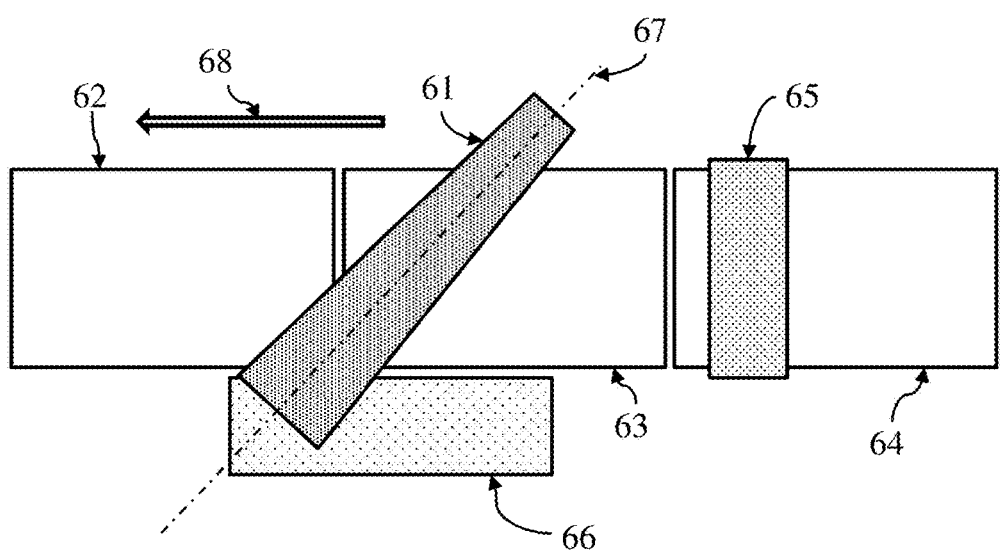
FIG. 6 schematically shows a top view of a material remover comprising a conical roller.

The remover may remove the surplus of material from the building platform into a bin. The material that is deposited into a bin may be removed periodically, for example for re-use in the deposition head. The position of a bin depends on the type of material remover and its orientation relative to the building platform. The bin may have a fixed position relative to the remover or the bin may have a fixed position relative to a carrier. In the later case the bin may be attached to the carrier. Such a construction requires a large number of bins in a production line comprising many building platforms. An advantage may be that only the material that is deposited on the corresponding platform is deposited in a bin. In particular when different products are made out of different materials, such construction is advantageous in view of possible re-use or recycling of the material. A bin may be positioned besides the platform conveyor as shown in FIG. 6 but it may also be positioned below the platform conveyor in such a way that the surplus of material falls in the bin when a platform comprising the material passes the bin and in the meantime the remover pushes the surplus of material off the platform. Bins may also be placed on special carriers that are positioned between the carriers comprising the building platforms. Such an embodiment can be illustrated with reference to FIG. 5. When the distance between the carriers comprising the platforms (43,53) is sufficient large for the bin (52) to be placed in between the building platforms than such an embodiment can be realised. A carrier comprising a bin may be placed directly against a trough, either during the whole processing or only when material is removed form the building platform. A surplus of material in a trough can easily be pushed into a bin when the trough and the bin are in contact with each other.

FIG. 6 is a top view of a part of a production line. This part of the production line comprising three building platforms (62, 63, 64), a material deposition head (65) and a conical roller (61) that is rotatable about and axis (67) in order to remove the surplus of material sideways from the platform into a bin (66). The axis is inclined at an angle relative to the direction (68) in which the platforms move during the manufacturing of the products. First, material is deposited on a platform and subsequently a surplus of material is removed.

Figure 7:
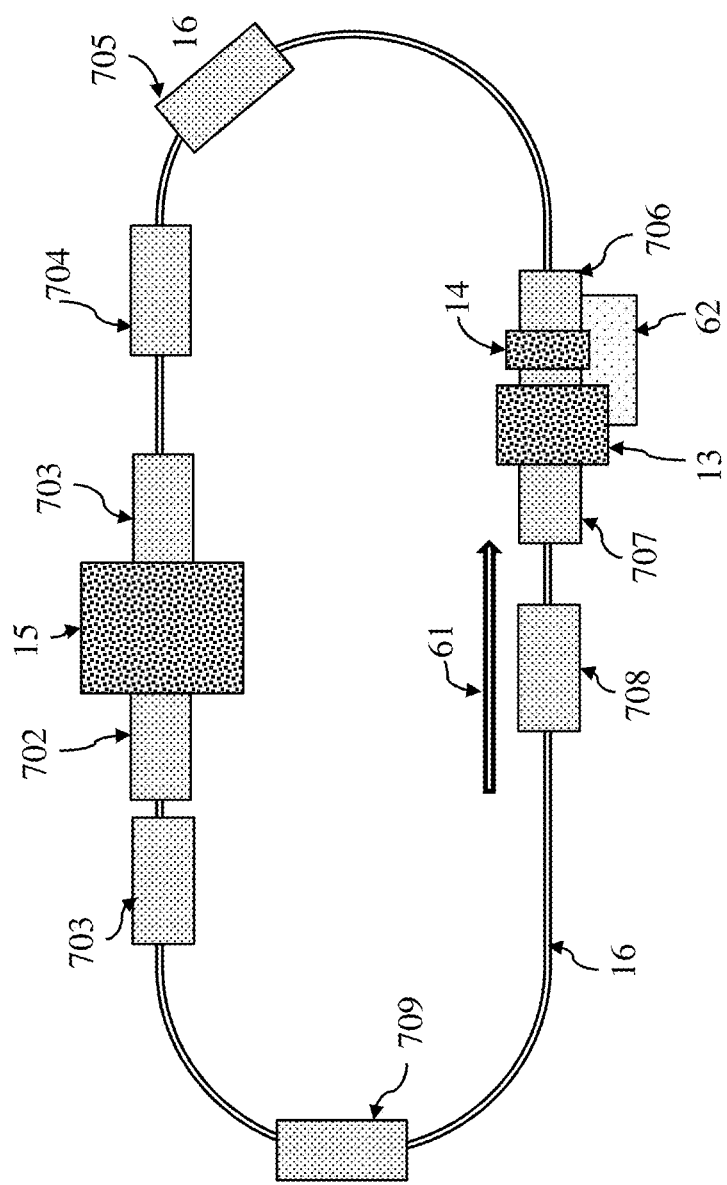
FIG. 7 schematically shows a production line comprising an endless platform conveyor.

The platform conveyor of the production line preferably is an endless conveyor. In addition to this endless conveyor, the production line may comprise a conveyor for supplying building platforms to the endless conveyor and a conveyor for removing building platforms from the endless conveyor. Alternatively, the production line may comprise pick and place equipment for placing platforms on the endless platform conveyor and picking platforms from the conveyor. In a preferred embodiment, troughs comprising the platform are placed on the conveyor and removed from the conveyor. Instead of placing and removing only the troughs and their contents, complete carriers may be placed and removed. The building platforms entering the endless conveyor may be empty whereas the building platforms leaving the endless conveyor may comprise the product, including not solidified material surrounding the product made from solidified material. An embodiment of the production line comprising an endless platform conveyor is shown in FIG. 7. The production line comprises a deposition head (13) and a material remover (14) that are positioned close to each other. However, the distance between the head and the remover may be larger. The material is solidified in the required pattern by an energy source (15) for solidifying the construction material. Here, this energy source is situated at a more remote position from the deposition head and the remover. Also in case that the construction material is solidified by using a binder, such solidification device or the oven that may be used for sintering the construction material, may preferably be positioned remote from the deposition head.

The production line further comprises nine building platforms (702 to 709) having dimensions that allow the platforms to be at a relative large distance to each other on the conveyor. Such a production line with a relative small number of platforms compared to the length of the conveyor may be preferred in a production line where the carriers comprising the building platforms can move relative to the conveyor and relative to each other. The relative large distance between the carriers allows that the velocity of the different platforms may be different during a certain period of time. Platforms where the layer of construction material is solidified may for example move faster than platforms comprising a layer that is not solidified yet. During a short period of time the direction of the movement of some carriers relative to each other may be different. In a production line where the building platforms are at a fixed position relative to the conveyor, the distance between the platforms may be small. An advantage of such a production line is that it possible to have more building platforms, and thus more products on a conveyor of the same length as the conveyor in a production line where the carriers can move individually with different velocity. In the embodiment of the production line shown in FIG. 7 the surplus of construction material is removed into a bin (62) that is positioned besides the conveyor. As mentioned before, bins may also be placed at other positions.

The movement direction (61) of the carriers will in general be such that during one cycle, a carrier and the corresponding building platform first pass the deposition head (13), then the material remover (14) and finally the solidification device (15). However, the movement of the carriers may be in an opposite direction, although this may be less efficient because it may require an extra cycle for a layer to be solidified in a pattern. While moving in this opposite direction, the not yet solidified layer may pass the solidification device a first time without being solidified before a surplus of material is removed. In case that the material remover is a device for removing solidified material, for example by using a knife, such opposite direction may be preferred.

Figure 8:
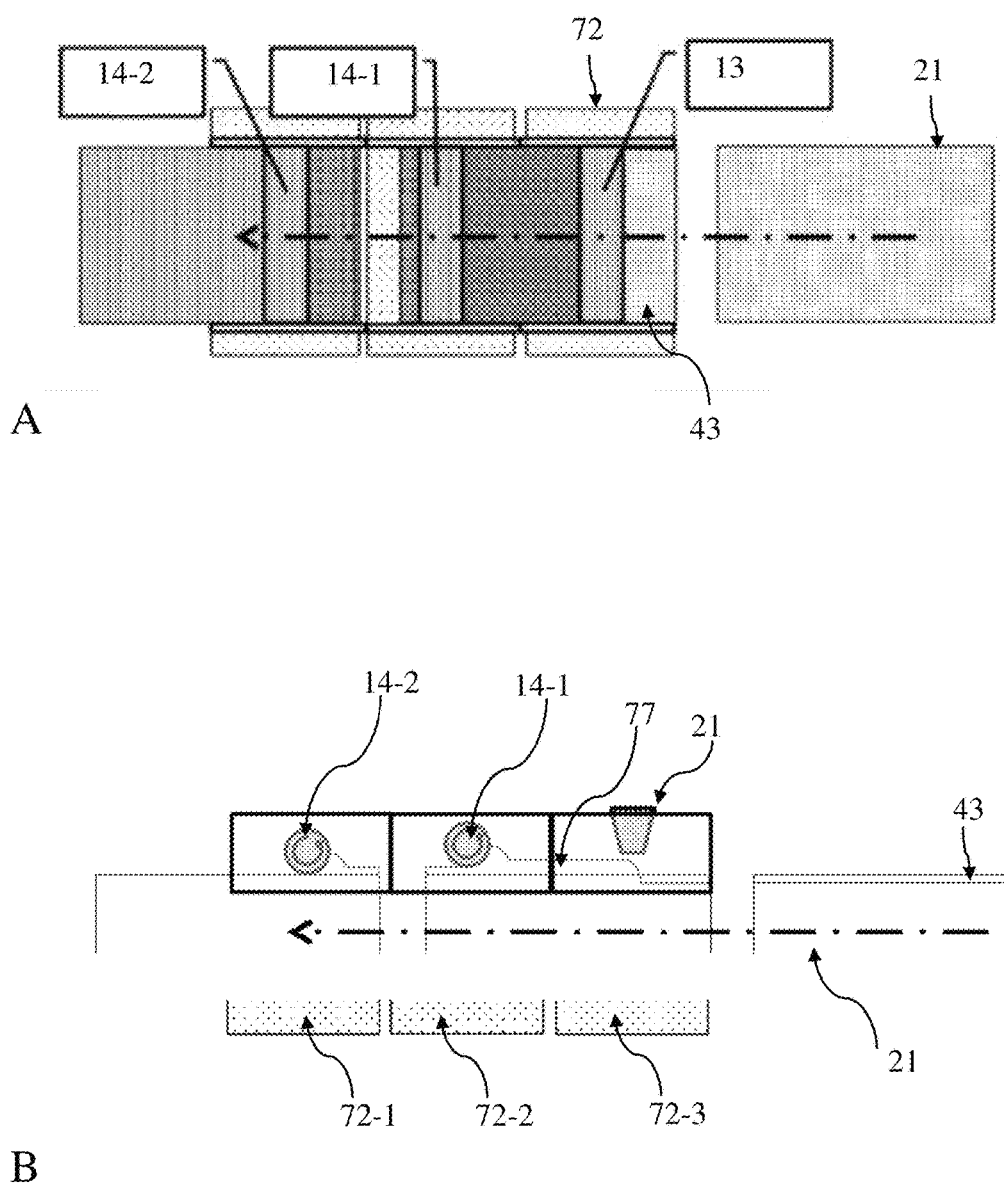
FIG. 8 shows an embodiment in top view (A) and side view (B) wherein a bin is at a fixed position relative to the removers.

FIG. 8 shows in more detail an embodiment in top view (A) and side view (B) wherein multiple bins 72-1; 72-2 and 72-3 are at a fixed position relative to the removers 14-1 and 14-2 below the platform conveyor 16 in such a way that the surplus of material falls in the bin when a platform 43 comprising the powder 77 material passes the bin 72 and in the meantime the remover 14-1 or 14-2 pushes the surplus of material off the platform 43 into respective bins 71-1 and 71-2. This embodiment has the advantage that the powder is removed directly from the moving carrier 21, which saves weight. Depending it can be recirculated or reused after treatment. FIG. 8a shows an embodiment with multiple remover rollers placed in series, e.g. to have a coarse and fine levelling. Each time, a carrier passes, an amount of powder will be pushed by the remover roller from a moving carrier in the rearward direction and falls in a stationary bin underneath the remover. The handling station may be equipped with control logic to form a gap between the carrier that is handled by the remover and a subsequent carriage. This may be controlled by speeding up the carrier to be handled, or advantageously, by slowing a subsequent carrier—in order to be able to form a deporting gap between subsequent carriages. After removal of powder from the carrier, the controller may adjust the speed. In addition to the bin underneath the roller a similar bin may be provided below the deposition head; which may be separated from the bin below the roller since the material purity may be of a different order, for efficient recycling. In the example, gravity drives the powder from the roller towards the bin, but there may be additional deporting mechanism, e.g. suction, or a belt mechanism, e.g. by arranging all stations in a large collecting bin that assembles powder from a plurality of the stations. Flanges are shown that form the troughs preventing powder from sideways falling over the edge, so that a limited amount of powder falls in intermediate spaces between the carriers.

Figure 9:
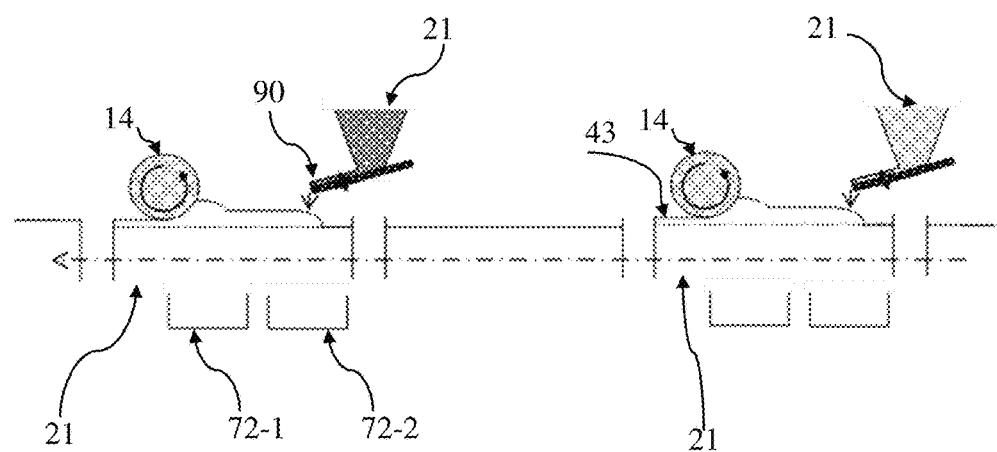
FIG. 9 shows an alternative embodiment.

FIG. 9 shows an alternative to the stationary bins of FIG. 8, which may be advantageous in a context of multiple deposition heads for depositing different materials, for example different construction materials. In the embodiment, one or more bins 72-1; 72-2 are at a fixed position relative to the carriers 21 in such a way that the surplus of material falls in the bin 72-1 when a platform comprising the material passes the remover 14 and in the meantime the remover 14 pushes the surplus of material off the platform 43. In this system, more flexibility in the building process can be achieved while at the same time providing optimal recycling re-use of the material. In this embodiment, building platforms may be equipped with a product specific powder, or a powder specific for a product phase, for instance, depending on a coloring pigment. For example, a color pattern may be provided by subsequent delivery devices 21 of a colored powder, e.g. in the form of a vibrating feed channel 90.

The invention claimed is:

1. A production line for layerwise manufacturing of tangible products comprising:
 a first carrier comprising a first building platform for supporting a first tangible product,
 a second carrier comprising a second building platform for supporting a second tangible product,
 a deposition head for depositing construction material onto the building platforms,
 a material remover for removing a surplus of the deposited construction material from the building platforms, wherein the material remover comprises a rotatable roller for removing a surplus of construction material from the building platform, and wherein the rotatable roller is a conical roller that is rotatable about an axis inclined at an angle relative to a direction in which the building platforms move during the manufacturing of the tangible products in order to remove the surplus of construction material sideways from the building platform,
 a solidification device for solidifying at least a part of the deposited construction material, and
 a platform conveyor for conveying the carriers towards and away from the deposition head repeatedly.

2. The production line according to claim 1, wherein each of the building platforms is enclosed in a trough for keeping construction material, wherein the trough has sidewalls.

3. The production line according to claim 2, further comprising a height adjustment means for moving the building platforms relative to the sidewalls of the trough in a direction parallel to a building direction.

4. The production line according to claim 1, wherein the platform conveyor is an endless conveyor.

5. The production line according to claim 1, wherein the building platforms are movable along the platform conveyor individually.

6. The production line according claim 1, wherein each material remover comprises a bin at a fixed position relative to the material remover for receiving a surplus of the construction material.

7. The production line according to claim 6, wherein the bin is at a fixed position relative to the material remover below the platform conveyor in such a way that the surplus of the construction material falls in the bin when a platform comprising the construction material passes the bin and in the meantime the material remover pushes the surplus of the construction material off the platform.

8. A production line for layerwise manufacturing of tangible products comprising:
 a first carrier comprising a first building platform for supporting a first tangible product,
 a second carrier comprising a second building platform for supporting a second tangible product,
 a deposition head for depositing construction material onto the building platforms,
 a material remover for removing a surplus of the deposited construction material from the building platforms, wherein the material remover comprises a rotatable roller for removing a surplus of construction material from the building platform, and wherein the material remover comprises a conveyor belt for conveying construction material from the building platforms,
 a solidification device for solidifying at least a part of the deposited construction material, and
 a platform conveyor for conveying the carriers towards and away from the deposition head repeatedly.

9. The production line according to claim 8, wherein each of the building platforms is enclosed in a trough for keeping construction material, wherein the trough has sidewalls.

10. The production line according to claim 9, further comprising a height adjustment means for moving the building platforms relative to the sidewalls of the trough in a direction parallel to a building direction.

11. The production line according claim 8, wherein the platform conveyor is an endless conveyor.

12. The production line according to claim 8, wherein the building platforms are movable along the platform conveyor individually.

13. The production line according claim 8, wherein each material remover comprises a bin at a fixed position relative to the material remover for receiving a surplus of the construction material.

14. The production line according to claim 13, wherein the bin is at a fixed position relative to the material remover below the platform conveyor in such a way that the surplus of the construction material falls in the bin when a platform comprising the construction material passes the bin and in the meantime the material remover pushes the surplus of the construction material off the platform.

15. A production line for layerwise manufacturing of tangible products comprising:
 a first carrier comprising a first building platform for supporting a first tangible product,
 a second carrier comprising a second building platform for supporting a second tangible product,
 a deposition head for depositing construction material onto the building platforms,
 a material remover for removing a surplus of the deposited construction material from the building platforms,
 a solidification device for solidifying at least a part of the deposited construction material, and
 a platform conveyor for conveying the carriers towards and away from the deposition head repeatedly,
 wherein each of the carriers comprises a bin for receiving a surplus of the construction material.

16. The production line according to claim 15, wherein the bin is at a fixed position relative to the carrier in such a way that the surplus of the construction material falls in the bin when a platform comprising the construction material passes the material remover and in the meantime the material remover pushes the surplus of the construction material off the platform.

17. The production line according to claim 15, wherein each of the building platforms is enclosed in a trough for keeping construction material, wherein the trough has sidewalls.

18. The production line according to claim 17, further comprising a height adjustment means for moving the building platforms relative to the sidewalls of the trough in a direction parallel to a building direction.

19. The production line according to claim 15, wherein the platform conveyor is an endless conveyor.

20. The production line according to claim 15, wherein the building platforms are movable along the platform conveyor individually.

\* \* \* \* \*